United States Patent
Wada et al.

(10) Patent No.: US 12,538,024 B2
(45) Date of Patent: Jan. 27, 2026

(54) IMAGING APPARATUS

(71) Applicant: Panasonic Intellectual Property Management Co., Ltd., Osaka (JP)

(72) Inventors: Rintaro Wada, Osaka (JP); Jun Saiki, Hyogo (JP); Yoshiaki Kudo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 113 days.

(21) Appl. No.: 18/428,310

(22) Filed: Jan. 31, 2024

(65) Prior Publication Data

US 2024/0267623 A1 Aug. 8, 2024

(30) Foreign Application Priority Data

Feb. 6, 2023 (JP) ................... 2023-016224

(51) Int. Cl.
*H04N 23/68* (2023.01)

(52) U.S. Cl.
CPC ............... *H04N 23/6812* (2023.01)

(58) Field of Classification Search
CPC .................................. H04N 23/6812
USPC ...................................... 348/208.2
See application file for complete search history.

(56) References Cited

U.S. PATENT DOCUMENTS

| | | | |
|---|---|---|---|
| 2018/0103205 A1 | 4/2018 | Kikuchi et al. | |
| 2020/0322517 A1* | 10/2020 | Tani | H04N 23/687 |
| 2020/0393695 A1 | 12/2020 | Hazama | |
| 2021/0152720 A1* | 5/2021 | Awazu | G03B 9/36 |
| 2021/0203849 A1 | 7/2021 | Imaizumi | |
| 2023/0185168 A1* | 6/2023 | Kang | G03B 5/00 359/726 |
| 2024/0129628 A1* | 4/2024 | Takagi | H04N 23/687 |

FOREIGN PATENT DOCUMENTS

| | | | | |
|---|---|---|---|---|
| JP | 2009-086544 A | | 4/2009 | |
| JP | 2010085928 A | * | 4/2010 | G06V 40/166 |
| JP | 2018-060160 A | | 4/2018 | |
| JP | 2020-201447 A | | 12/2020 | |
| JP | 2021-103290 A | | 7/2021 | |

OTHER PUBLICATIONS

1st Office Action in related Japanese Patent Appln. No. 2023-016224, dated Apr. 20, 2023.
Final Office Action in related Japanese Patent Appln. No. 2023-016224, dated Jul. 24, 2023.

* cited by examiner

*Primary Examiner* — Anthony J Daniels
(74) *Attorney, Agent, or Firm* — Renner, Otto, Boisselle & Sklar, LLP

(57) ABSTRACT

An imaging apparatus includes a sensor for vibration detection; an electronic component configured to receive a signal from the sensor; a wiring member including a first portion to be connected to the sensor and a second portion to be connected to the electronic component; a sensor support member to which the sensor and the first portion of the wiring member are fixed; and a vibration damping member provided for a third portion being an intermediate portion between the first portion and the second portion in the wiring member.

7 Claims, 9 Drawing Sheets

IMAGING APPARATUS

BACKGROUND OF THE INVENTION

Field of the Invention

The present disclosure relates to an imaging apparatus including vibration detection sensors.

Description of the Related Art

For example, in the imaging apparatus described in JP 2021-103290 A, a plurality of sensors (gyro sensors) used to detect vibration of the imaging apparatus caused by shaking of the user's hand is provided on a wiring member (flexible circuit board). A portion of the wiring member provided with the plurality of sensors is supported through a buffer member. The buffer member suppresses transmission of an impact generated when the shutter operates to the sensors.

SUMMARY OF THE INVENTION

However, in the case of the imaging apparatus described in JP 2021-103290 A, there is a possibility that an impact (vibration due to the impact) derived from the shutter operation is transmitted to the sensors through the wiring member. With this, the sensors may erroneously detect the impact derived from the shutter operation as the vibration due to the shaking of the user's hand, and as a result, the detection accuracy of the vibration of the imaging apparatus due to the shaking of the user's hand to be originally detected may decrease.

Therefore, an object of the present disclosure is to suppress transmission of vibration to sensors through a wiring member connected to the sensors in an imaging apparatus including vibration detection sensors.

In order to solve the above problem, according to one aspect of the present disclosure, an imaging apparatus is provided including: a sensor for vibration detection; an electronic component configured to receive a signal from the sensor; a wiring member including a first portion to be connected to the sensor and a second portion to be connected to the electronic component; a sensor support member to which the sensor and the first portion of the wiring member are fixed; and a vibration damping member provided for a third portion being an intermediate portion between the first portion and the second portion in the wiring member.

According to the present disclosure, it is possible to suppress transmission of vibration to sensors through a wiring member connected to the sensors in an imaging apparatus including vibration detection sensors.

DESCRIPTION OF THE PREFERRED EMBODIMENTS

Hereinafter, embodiments will be described in detail with reference to the drawings as appropriate. However, a detailed description more than necessary may be omitted. For example, a detailed description of already well-known matters and a redundant description of substantially the same configuration may be omitted. This is to avoid the following description from becoming unnecessarily redundant and to facilitate understanding by those skilled in the art.

It should be noted that the inventor(s) provides (provide) the accompanying drawings and the following description for a person skilled in the art to fully understand the present disclosure. Thus, the drawings and the description are not intended to limit the subject matter defined in the claims.

Hereinafter, an imaging apparatus according to embodiments of the present disclosure will be described with reference to the drawings.

Figure 1:
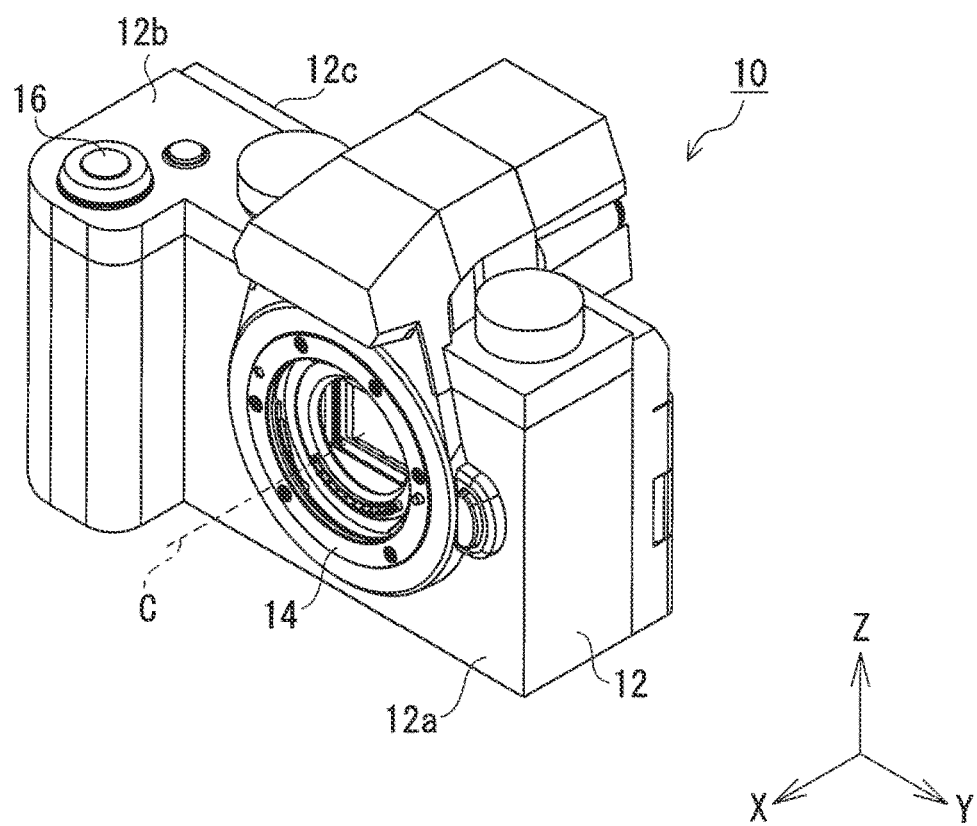
FIG. 1 is a perspective view of an imaging apparatus according to one embodiment of the present disclosure.
Figure 2:
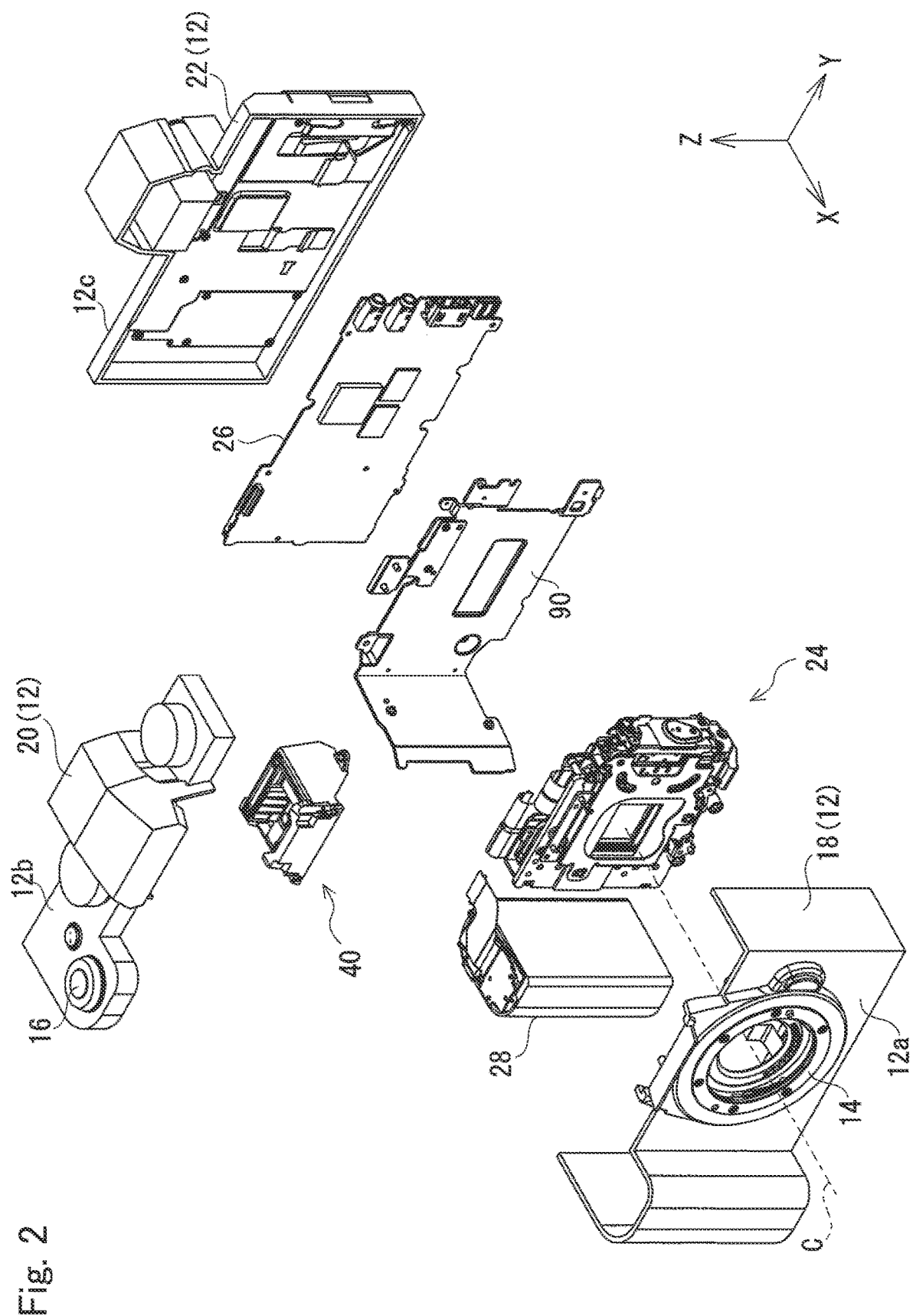
FIG. 2 is an exploded perspective view of the imaging apparatus.

FIG. 1 is a perspective view of an imaging apparatus according to an embodiment of the present disclosure. In addition, FIG. 2 is an exploded perspective view of the imaging apparatus. Furthermore, FIG. 3 is an exploded perspective view of an imaging unit.

It should be noted that the X-Y-Z orthogonal coordinate system shown in the drawings is for facilitating understanding of embodiments of the present disclosure, and does not limit the embodiments of the present disclosure. The X-axis direction is a front-rear direction of the imaging apparatus, the Y-axis direction is a left-right direction, and the Z-axis direction is a height direction. The side on which the subject is present at the time of capturing is the front side of the imaging apparatus, and the right side and the left side of the imaging apparatus are the right side and the left side (in front view) when the imaging apparatus is viewed from the front.

Figure 3:
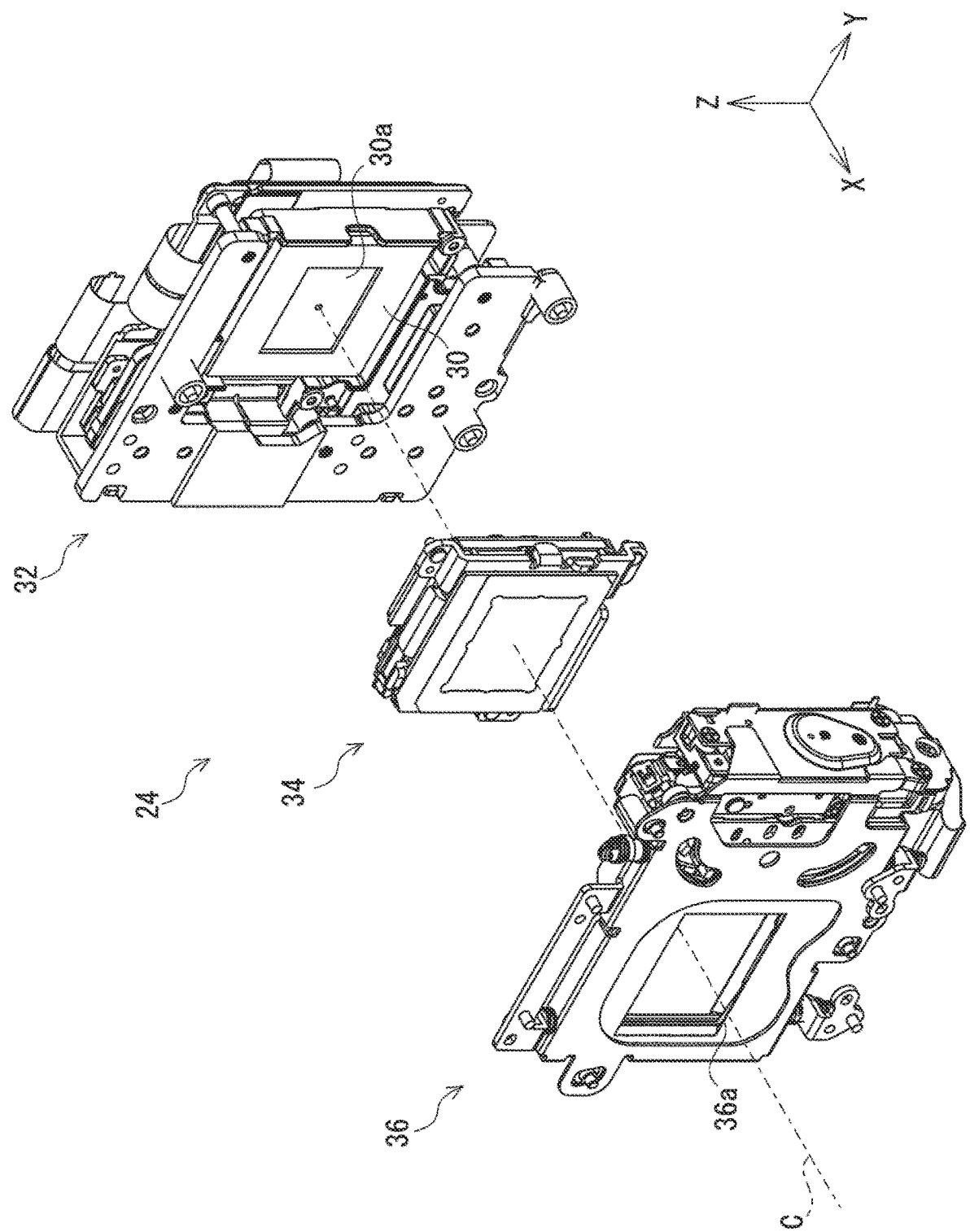
FIG. 3 is an exploded perspective view of an imaging unit.

As shown in FIGS. 1 to 3, an imaging apparatus 10 according to an embodiment of the present disclosure includes a housing 12. The front surface 12a of the housing 12 is provided with a lens mount 14 to which a lens (not shown) is detachably attached. In addition, the upper surface 12b of the housing 12 is provided with a shutter button 16.

As shown in FIG. 2, in the case of the present embodiment, the housing 12 of the imaging apparatus 10 includes a front casing 18 provided with a lens mount 14 and including a front surface 12a of the housing 12, a top casing 20 provided with a shutter button 16 and including an upper surface 12b of the housing 12, and a rear casing 22 including a rear surface 12c of the housing 12.

In addition, as shown in FIGS. 2 and 3, an imaging unit 24 that converts an image of a subject transmitted through the lens attached to the lens mount 14 into image data is mounted in the housing 12. In the case of the present embodiment, the imaging unit 24 is fixed to a back side portion of the front casing 18 of the housing 12. In addition, a control board 26 that controls the imaging unit 24 and the like is mounted in the housing 12. In the case of the present embodiment, the control board 26 is fixed to the front casing 18 of the housing 12 with interposition of the heat transfer member 90. It should be noted that the heat transfer member 90 is a member that is positioned between the sensor unit 40 and the control board 26 as shown in the left-right direction (Y-axis direction), absorbs heat generated in the control board 26, and transfers the heat to the housing 12. Furthermore, a battery 28 that supplies power to the imaging unit 24, the control board 26, and the like is mounted in the housing 12.

As shown in FIG. 3, the imaging unit 24 includes an imaging element 30 that converts an image of a subject into image data. The imaging element 30 includes a light receiving surface 30a on which an image of a subject transmitted through a lens attached to the lens mount 14 is incident.

In addition, the imaging unit 24 includes an Image stabilization unit 32 that displaces the imaging element 30 in the left-right direction (Y-axis direction) and the height direction (Z-axis direction) of the imaging apparatus 10.

The Image stabilization unit 32 is a unit for suppressing image blur caused by vibration transmitted from the user's hand to the imaging apparatus 10. To that end, the Image stabilization unit 32 is configured to displace the imaging element 30 in two directions (the left-right direction (Y-axis direction) and the height direction (Z-axis direction)) orthogonal to the extending direction (front-rear direction (X-axis direction)) of the optical axis C orthogonal to the light receiving surface 30a. Specifically, the Image stabilization unit 32 displaces the imaging element 30 in a direction opposite to the direction in which the housing 12 of the imaging apparatus 10 is displaced, whereby the image blur is suppressed.

Furthermore, the imaging unit 24 includes a filter unit 34 that is disposed in front of the light receiving surface 30a of the imaging element 30 and includes a plurality of filters such as an infrared filter that cuts infrared rays included in light from a subject and a protective glass that protects the light receiving surface 30a.

Furthermore, the imaging unit 24 includes a shutter unit 36 that is disposed in front of the filter unit 34 and adjusts the exposure time. When the shutter button 16 is pressed, the shutter 36a in the shutter unit 36 is closed, and light directed to the light receiving surface 30a of the imaging element 30 is blocked. It should be noted that, in the case of the present embodiment, the shutter 36a of the shutter unit 36 moves substantially in the height direction (Z-axis direction) of the imaging apparatus 10.

In order for the Image stabilization unit 32 to appropriately displace the imaging element 30, as shown in FIG. 2, a sensor unit 40 for detecting vibration of the imaging apparatus 10 is provided in the imaging apparatus 10. In the case of the present embodiment, the sensor unit 40 is mounted in the housing 12.

Figure 4:
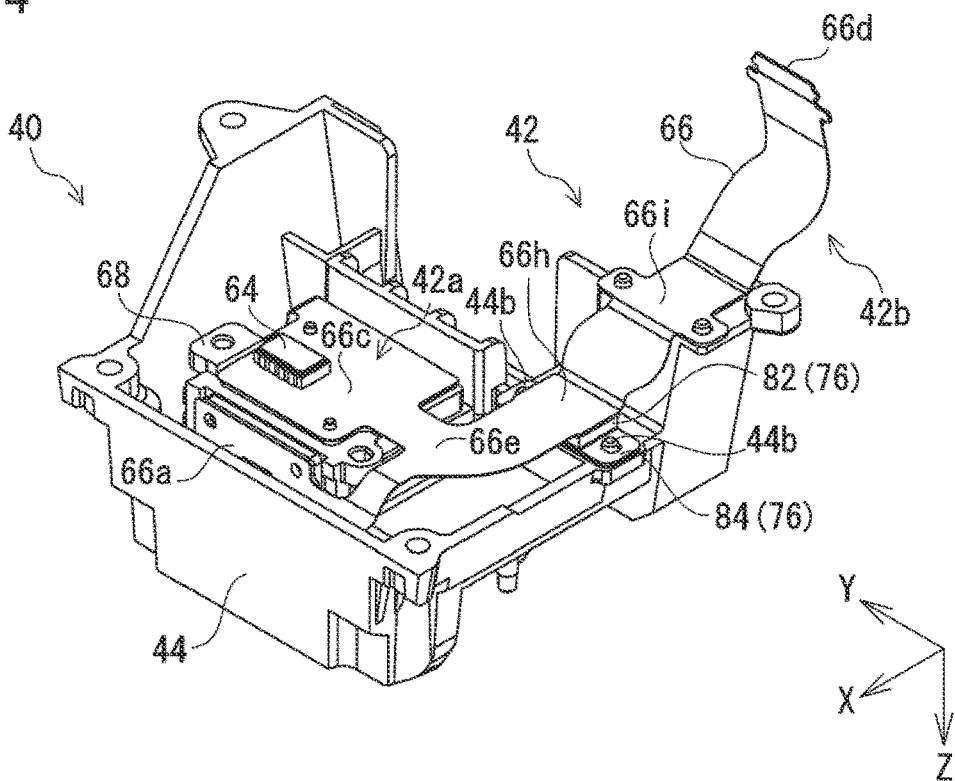
FIG. 4 is a perspective view of a sensor unit.
Figure 5:
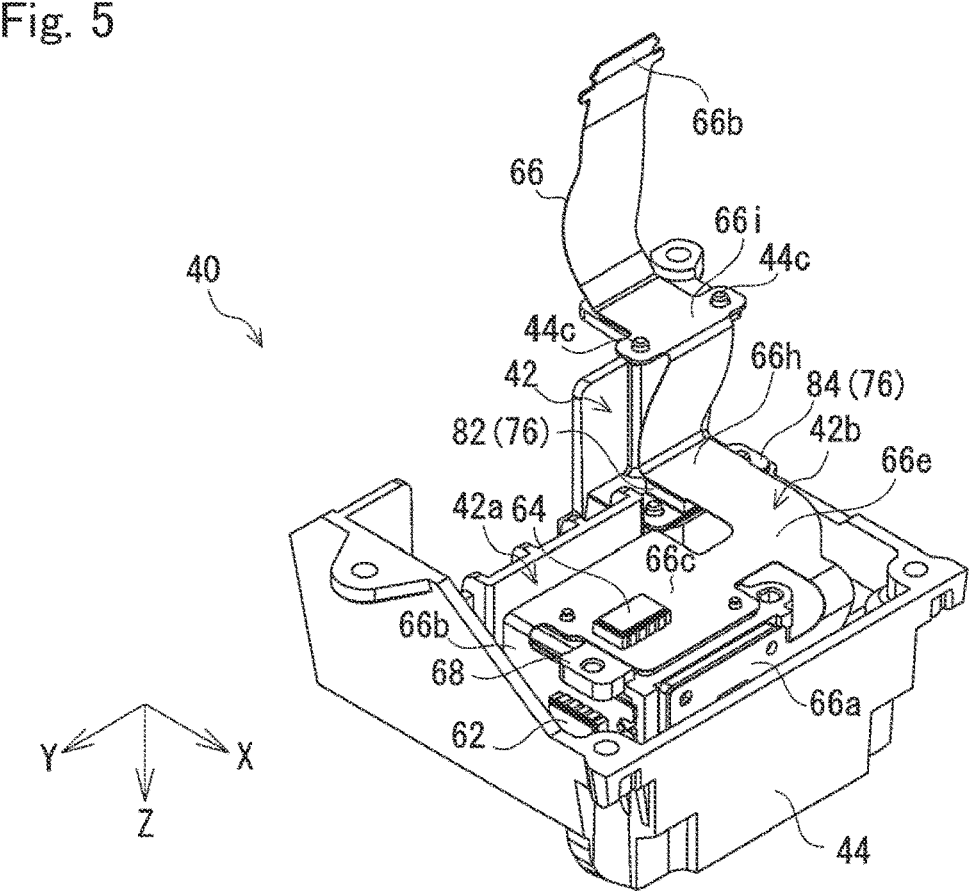
FIG. 5 is a perspective view of the sensor unit viewed from a viewpoint different from that in FIG. 4.
Figure 6:
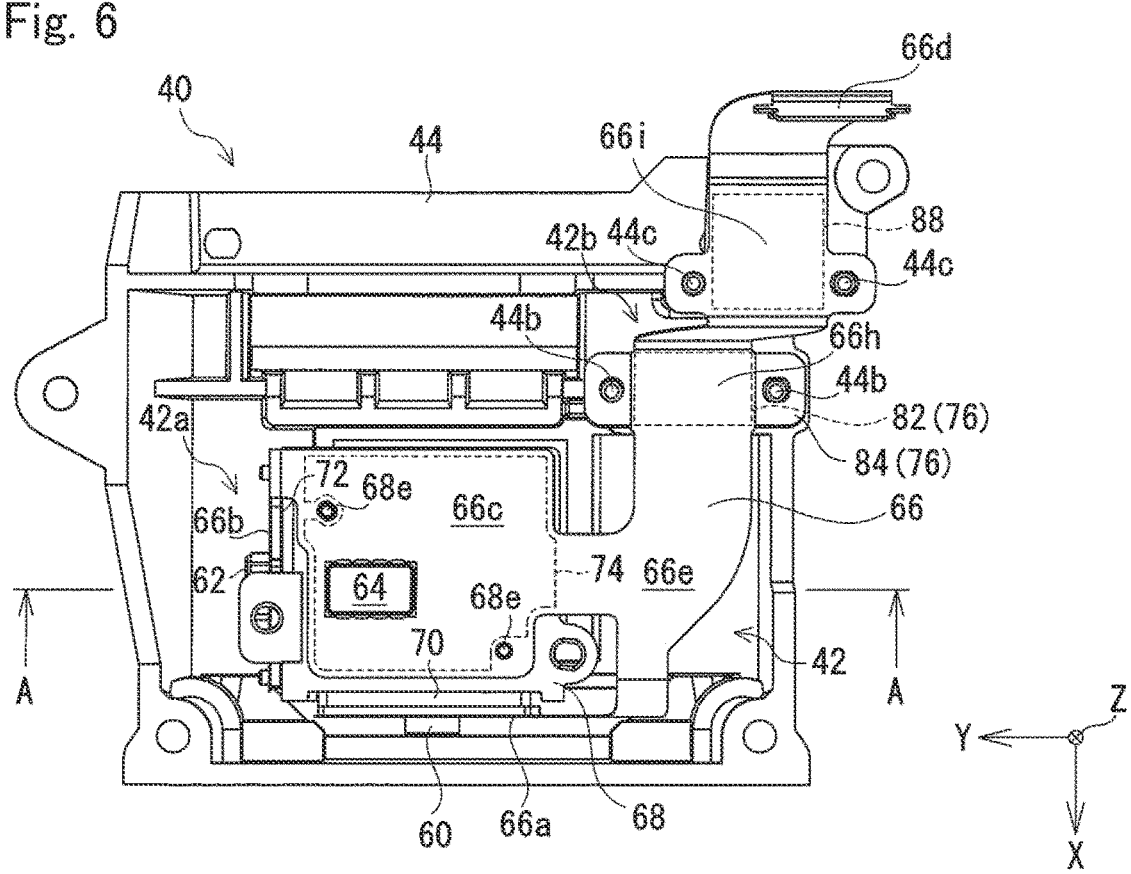
FIG. 6 is a bottom view of the sensor unit.
Figure 7:
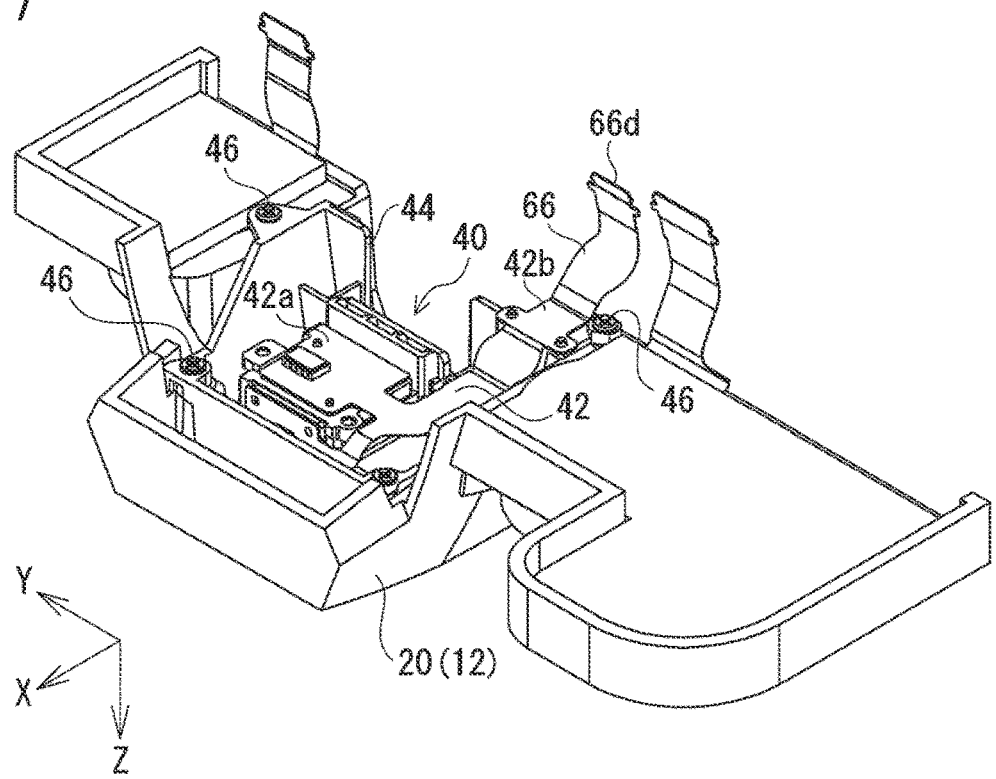
FIG. 7 is a perspective view of a top casing in a state where the sensor unit is attached.
Figure 8:
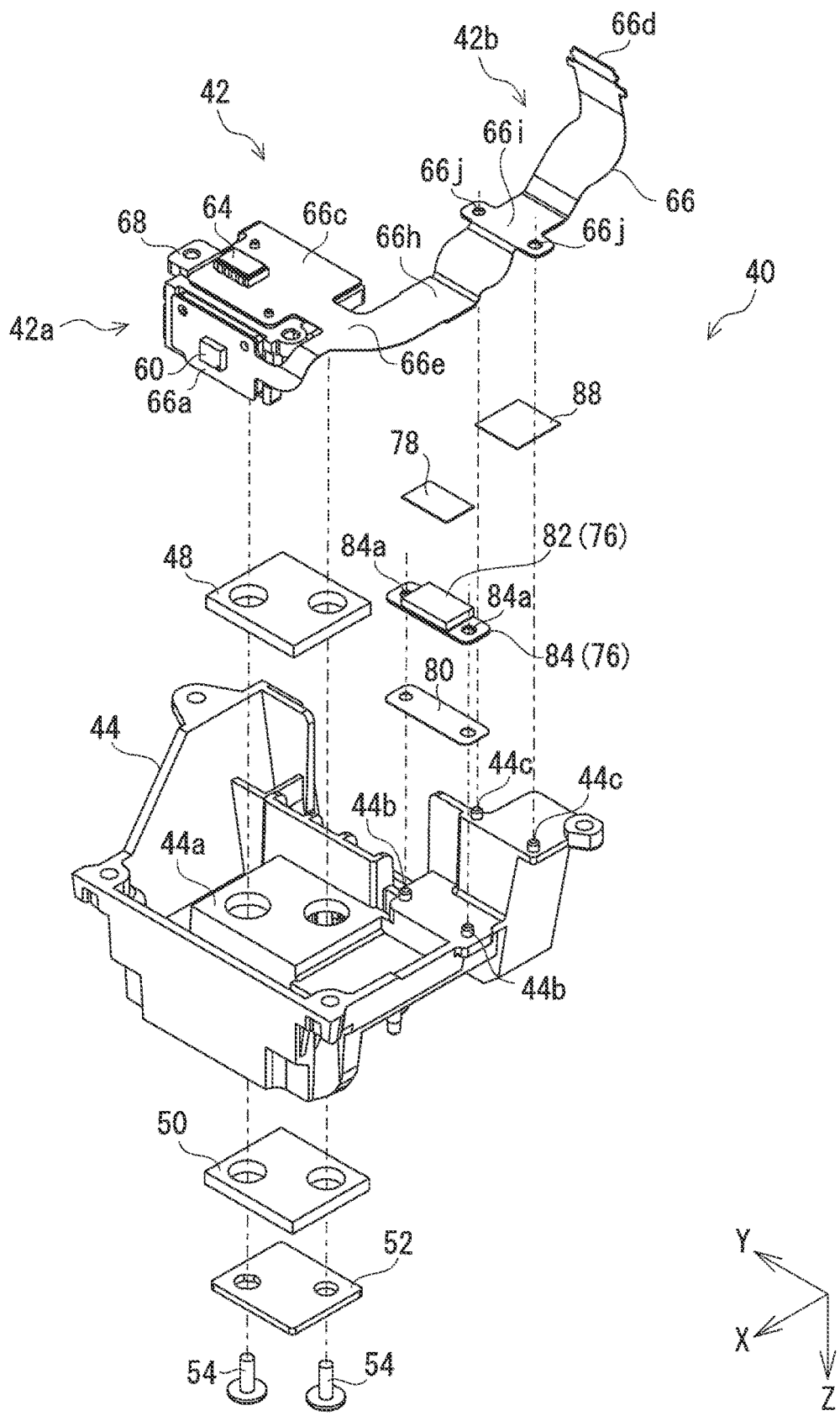
FIG. 8 is an exploded perspective view of the sensor unit.
Figure 9:
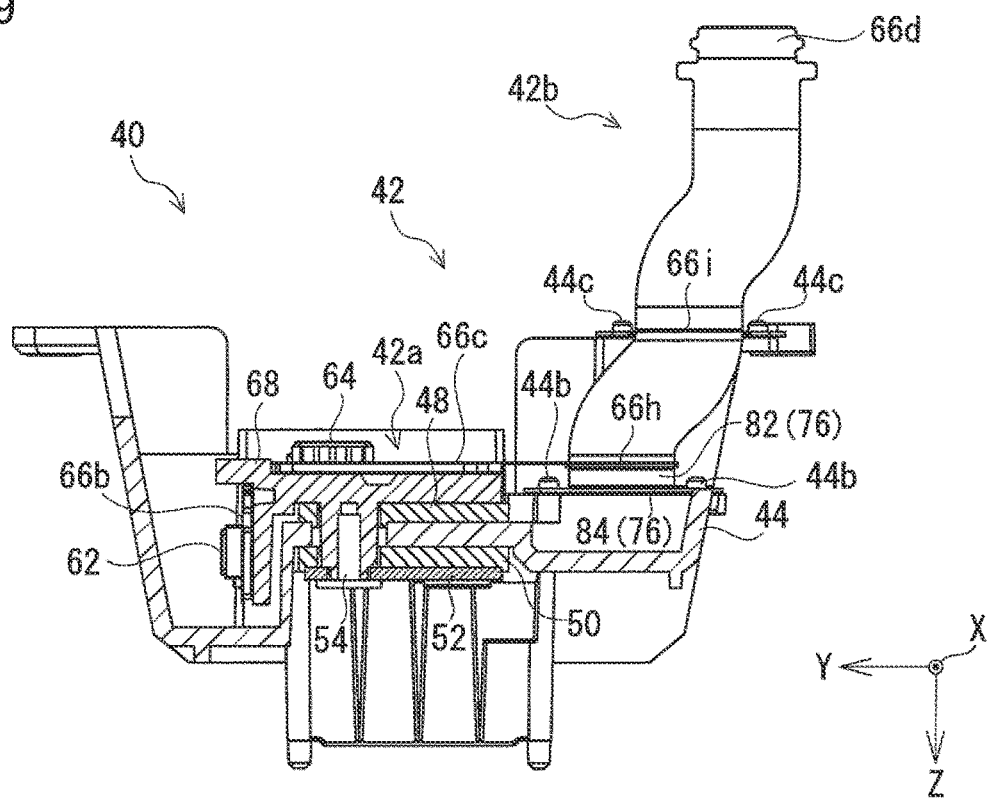
FIG. 9 is a cross-sectional view of the sensor unit taken along line A-A in FIG. 6.

FIGS. 4 and 5 are perspective views of the sensor unit viewed from different viewpoints. In addition, FIG. 6 is a bottom view of the sensor unit. Furthermore, FIG. 7 is a perspective view of the top casing in a state where the sensor unit is attached. Furthermore, FIG. 8 is an exploded perspective view of the sensor unit. In addition, FIG. 9 is a cross-sectional view of the sensor unit. It should be noted that the cross-sectional view shown in FIG. 9 is a cross-sectional view taken along line A-A shown in FIG. 6.

As shown in FIGS. 4 to 9, the sensor unit 40 includes a sensor module 42 for detecting vibration of the imaging apparatus 10. In the case of the present embodiment, the sensor module 42 is a gyro sensor module that detects angular velocity. In addition, as shown in FIG. 8, the sensor module 42 schematically includes a sensor mounting portion 42a that detects vibration and an FPC extending portion 42b that transmits a signal corresponding to the detected vibration. It should be noted that details of each of the sensor mounting portion 42a and the FPC extending portion 42b of the sensor module 42 will be described below.

In addition, the sensor unit 40 includes a base member 44 that supports the sensor module 42. The base member 44 functions as a bracket for attaching the sensor module 42 to the housing 12 of the imaging apparatus 10. In the case of the present embodiment, as shown in FIG. 7, the base member 44 of the sensor unit 40 is fixed to the back side portion of the top casing 20 of the housing 12 through a plurality of screws 46.

The sensor module 42 is fixed to the base member 44 in a state where transmission of an impact from the base member 44 to the sensor mounting portion 42a of the sensor module 42 is suppressed.

Specifically, the entire imaging apparatus 10 vibrates due to the shaking of the hand of the user grasping the imaging apparatus 10, that is, the sensor mounting portion 42a of the sensor module 42 in the imaging apparatus 10 vibrates. The sensor mounting portion 42a of the sensor module 42 detects the angular velocity corresponding to the vibration, and outputs a signal corresponding to the detected angular velocity to the control board 26 through the FPC extending portion 42b. Based on the received signal from the sensor module 42, the control board 26 calculates the amplitude and frequency of the vibration of the imaging apparatus 10. Then, based on the calculated amplitude and frequency of vibration, the control board 26 causes the Image stabilization unit 32 to execute an Image stabilization operation of displacing the imaging element 30 so that the imaging element 30 remains at a substantially constant position with respect to the subject. As a result, image blur is suppressed, and a captured image in which the outline of the subject is clearly shown is obtained.

When some components of the imaging apparatus 10 are displaced during such Image stabilization operation, an impact generated by the displacement may act on the sensor mounting portion 42a of the sensor module 42. Specifically, when the shutter button 16 is operated and pressed down by the user, an impact (impact derived from the shutter) caused by the displacement of the shutter button 16 and the movement of the shutter 36a of the shutter unit 36 based on the operation of the shutter button 16 is transmitted to the sensor mounting portion 42a of the sensor module 42 through the front casing 18, the top casing 20, and the base member 44. When the sensor mounting portion 42a of the sensor module 42 detects the impact (corresponding angular velocity), the detection accuracy of vibration of the entire imaging apparatus 10 due to shaking of the user's hand temporarily decreases, and the accuracy of the Image stabilization operation (that is, the displacement accuracy of the imaging element 30) temporarily decreases.

The sensor mounting portion 42a of the sensor module 42 is fixed to the base member 44 with interposition of the impact-absorbing members 48 and 50 so that such an impact derived from the shutter caused by the user operating the shutter button 16 is not transmitted to the sensor mounting portion 42a of the sensor module 42. In the case of the present embodiment, a viscoelastic member (for example, SORBO (registered trademark)) is used as the impact-absorbing members 48 and 50.

The viscoelastic member is a plate-shaped member made of a viscoelastic material having both elastic and viscous properties. The viscoelastic material has a characteristic that the shape is deformed when an impact is applied and returns to the shape before the impact is applied over time. Therefore, the viscoelastic material is the same as the elastic material in that the shape is deformed when an impact is applied, but is different from the elastic material in that it takes time to restore. Due to the characteristics of the viscoelastic material, the viscoelastic member can absorb impact.

In the case of the present embodiment, as shown in FIGS. 8 and 9, the sensor mounting portion 42a of the sensor module 42 is supported by the sensor attachment portion 44a of the base member 44 with interposition of the impact-absorbing member 48. The sensor mounting portion 42a of the sensor module 42 and the sensor attachment portion 44a of the base member 44 face each other in the moving direction (Z-axis direction) of the shutter button 16 and the shutter 36a. The impact-absorbing member 48 is interposed therebetween. In addition, the impact-absorbing member 50 is provided so as to face the impact-absorbing member 48 across the sensor attachment portion 44a of the base member 44. The impact-absorbing member 50 is disposed between the sensor attachment portion 44a and the fixing plate 52 facing each other in the moving direction (Z-axis direction) of the shutter 36a. The fixing plate 52 is fixed to the sensor mounting portion 42a of the sensor module 42 through the screw 54 penetrating the impact-absorbing member 50, the sensor attachment portion 44a of the base member 44, and the impact-absorbing member 48. With such a fixing method, the sensor mounting portion 42a of the sensor module 42 is fixed to the base member 44 through the impact-absorbing members 48 and 50 without being directly in contact with the base member 44. Therefore, when an impact is transmitted to the base member 44, the impact-absorbing members 48 and 50 absorb the impact without substantially displacing the sensor mounting portion 42a of the sensor module 42. Accordingly, even when the shutter button 16 is operated by the user during the Image stabilization operation, the sensor mounting portion 42a of the sensor module 42 can detect vibration (corresponding angular velocity) of the entire imaging apparatus 10 caused by shaking of the hand of the user with high accuracy. As a result, the Image stabilization operation can be executed with high accuracy.

It should be noted that, as a matter of course, the impact-absorbing members 48 and 50 have rigidity of not being substantially deformed by vibration of the imaging apparatus 10 due to shaking of the user's hand. Accordingly, the sensor mounting portion 42a of the sensor module 42 can detect vibration (corresponding angular velocity) of the entire imaging apparatus 10 caused by shaking of the hand of the user with high accuracy.

With regard to the impact derived from the shutter, as described above, the transmission of the impact from the base member 44 to the sensor mounting portion 42a of the sensor module 42 is suppressed by the impact-absorbing members 48 and 50. However, through another path, vibration derived from this impact may be transmitted to the sensor mounting portion 42a of the sensor module 42. In order to describe this transmission of vibration, the configuration of the sensor module 42 will be specifically described.

Figure 10:
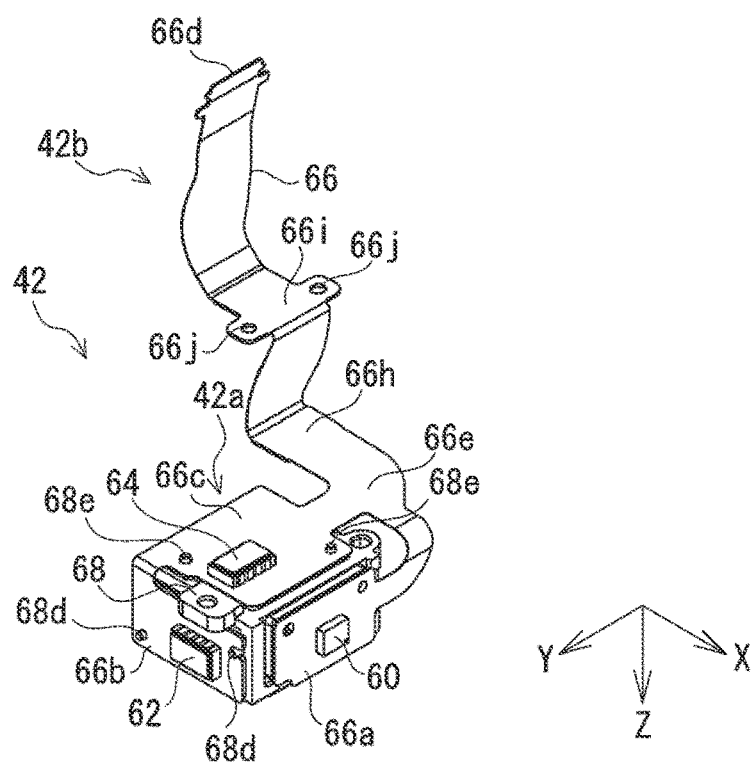
FIG. 10 is a perspective view of a sensor module.

FIG. 10 is a perspective view of the sensor module. In addition, FIG. 11 is an exploded perspective view of the sensor module.

Figure 11:
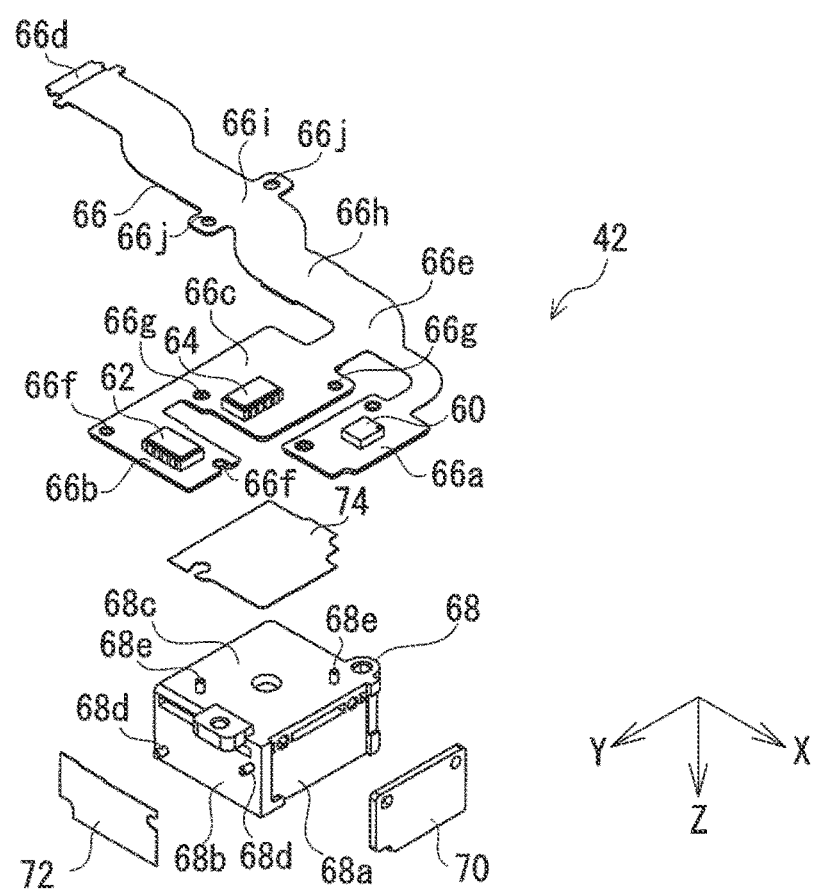
FIG. 11 is an exploded perspective view of the sensor module.

As shown in FIGS. 10 and 11, the sensor module 42 includes gyro sensors 60, 62, and 64 that detect angular velocities in the front-rear direction (X-axis direction), the left-right direction (Y-axis direction), and the height direction (Z-axis direction) of the imaging apparatus 10, respectively. Based on the angular velocities detected by the respective gyro sensors 60, 62, and 64, the imaging element 30 is displaced by the Image stabilization unit 32 in the left-right direction and the height direction so as to remain at a substantially constant position with respect to the subject.

In addition, in the case of the present embodiment, the sensor module 42 includes a flexible circuit board 66 as the wiring member. As shown in FIG. 11, the flexible circuit board 66 includes a sensor mounting portion 66a electrically connected to the gyro sensor 60 (that is, the gyro sensor 60 is mounted), a sensor mounting portion 66b electrically connected to the gyro sensor 62 (that is, the gyro sensor 62 is mounted), and a sensor mounting portion 66c (first portion) electrically connected to the gyro sensor 64 (that is, the gyro sensor 64 is mounted). In addition, the flexible circuit board 66 includes a connection portion 66d (second portion) electrically connected to the control board 26. The flexible circuit board 66 extends from the connection portion 66d to a branch portion 66e and is divided from the branch portion 66e into a sensor mounting portion 66a and a sensor mounting portion 66c. Then, the flexible circuit board 66 extends from the sensor mounting portion 66c to the sensor mounting portion 66b.

Furthermore, the sensor module 42 includes a sensor support member 68 that supports each of the plurality of sensor mounting portions 66a, 66b, and 66c of the flexible circuit board 66. As shown in FIG. 9, the sensor module 42 is supported by (fixed to) the base member 44 through the sensor support member 68. The plurality of sensor mounting portions 66a, 66b, and 66c of the flexible circuit board 66 and the sensor support member 68 constitute the sensor mounting portion 42a of the sensor module 42.

As shown in FIG. 11, the sensor support member 68 also includes a support surface 68a facing the front-rear direction (X-axis direction), a support surface 68b facing the left-right direction (Y-axis direction), and a support surface 68c facing the height direction (Z-axis direction) of the imaging apparatus 10. The sensor mounting portion 66a of the flexible circuit board 66 on which the gyro sensor 60 is mounted is fixed to the support surface 68a with interposition of a double-sided tape 70. In addition, the sensor mounting portion 66b of the flexible circuit board 66 on which the gyro sensor 62 is mounted is fixed to the support surface 68b with interposition of a double-sided tape 72. Then, the sensor mounting portion 66c of the flexible circuit board 66 on which the gyro sensor 64 is mounted is fixed to the support surface 68c with interposition of a double-sided tape 74.

It should be noted that, in the case of the present embodiment, the sensor mounting portions 66b and 66c of the flexible circuit board 66 on which the gyro sensors 62 and 64 greatly involved in the Image stabilization operation are respectively mounted are fixed to the sensor support member 68 in a positioned state. To that end, the sensor support member 68 is provided with pin-shaped protruding portions 68d and 68e. Through hole-shaped or notch-shaped recessed portions 66f and 66g to be engaged with the protruding portions 68d and 68e are provided in the sensor mounting portions 66b and 66c of the flexible circuit board 66.

As described above, and as shown in FIG. 9, with regard to the impact derived from the shutter, transmission of the impact from the base member 44 to the sensor mounting portion 42a of the sensor module 42, that is, the sensor support member 68 is suppressed by the impact-absorbing members 48 and 50. However, due to this impact, the FPC extending portion 42b of the sensor module 42, that is, the portion of the flexible circuit board 66 excluding the sensor mounting portions 66a, 66b, and 66c may vibrate.

An impact derived from the shutter is transmitted from the top casing 20 provided with the shutter button 16 to the control board 26 provided in the rear casing 22 through the rear casing 22. In addition, an impact is transmitted from the shutter unit 36 in which the shutter 36a is operated to the control board 26 through the front casing 18 and the heat transfer member 90. Due to the impact being transmitted to the control board 26, the flexible circuit board 66 connected to the control board 26 vibrates, and the vibration can be transmitted to the sensor mounting portion 42a, that is, the gyro sensors 60, 62, and 64 connected to the flexible circuit board 66. When the gyro sensors 60, 62, and 64 detect this vibration (corresponding angular velocity) during the Image stabilization operation, the detection accuracy of vibration of the entire imaging apparatus 10 due to shaking of the user's hand temporarily decreases, and the accuracy of the Image stabilization operation (that is, the displacement accuracy of the imaging element 30) temporarily decreases.

Specifically describing, when an impact is transmitted to the control board 26, vibration propagates from the connection portion 66d of the flexible circuit board 66 connected to the control board 26 toward the sensor mounting portions 66a and 66c. This propagation of vibration occurs because the portion of the flexible circuit board 66 between the connection portion 66d and the sensor mounting portions 66a and 66c is not fixed to other members and is in a freely displaceable state. In addition, this is also because the flexible circuit board 66 has flexibility. In order to suppress such vibration of the flexible circuit board 66, the sensor unit 40 includes a vibration damping member 76 as shown in FIG. 8.

As shown in FIGS. 6 and 8, the vibration damping member 76 is provided for an intermediate portion 66h (third portion) between the sensor mounting portion 66c (first portion) and the connection portion 66d (second portion) of the flexible circuit board 66. The vibration damping member 76 is fixed to the flexible circuit board 66 with interposition of a double-sided tape 78. In addition, in the case of the present embodiment, the vibration damping member 76 is fixed to the base member 44 with interposition of a double-sided tape 80.

Figure 12:
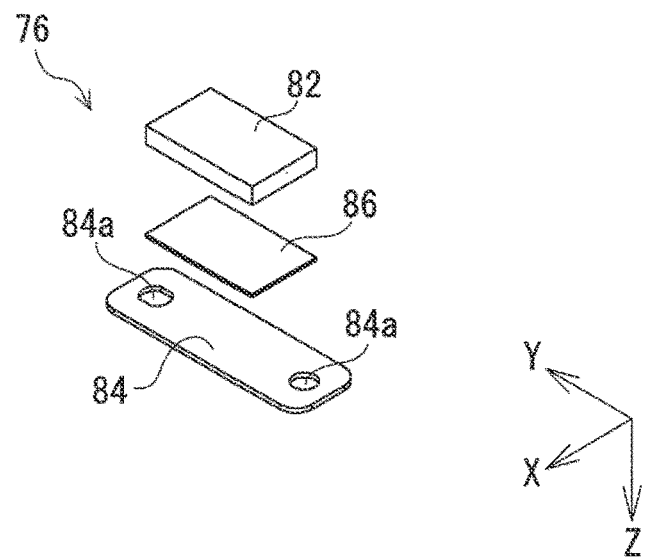
FIG. 12 is an exploded perspective view of a vibration damping member.

FIG. 12 is an exploded perspective view of the vibration damping member.

As shown in FIG. 12, in the case of the present embodiment, the vibration damping member 76 includes a cushion member 82 and a bracket member 84 that supports the cushion member 82. The cushion member 82 is fixed to the bracket member 84 with interposition of a double-sided tape 86.

The cushion member 82 is a plate-shaped member made of an elastic material, for example. The cushion member 82 is fixed to the intermediate portion 66h of the flexible circuit board 66 with interposition of the double-sided tape 78. It should be noted that, in order to absorb vibration, the cushion member 82 is preferably made of an elastic material having smaller deformation resistance than the viscoelastic material used for the impact-absorbing members 48 and 50, that is, having a shape that is quickly restored.

The bracket member 84 is made of a material having higher rigidity than the cushion member 82, for example, a metal material or a resin material. In addition, in the case of the present embodiment, the bracket member 84 is fixed to the base member 44 with interposition of the double-sided tape 80.

According to such a vibration damping member 76, when an impact derived from the shutter is transmitted to the control board 26, and thus vibration is propagated from the connection portion 66d toward the sensor mounting portions 66a and 66c of the flexible circuit board 66 connected to the control board 26, the vibration is absorbed by the cushion member 82 of the vibration damping member 76. With this, the vibration is suppressed from reaching the sensor mounting portion 42a of the sensor module 42, that is, the gyro sensors 60, 62, and 64. Accordingly, even when the shutter button 16 is operated by the user during the Image stabilization operation, the gyro sensors 60, 62, and 64 of the sensor module 42 can detect vibration (corresponding angular velocity) of the entire imaging apparatus 10 caused by shaking of the user's hand with high accuracy. As a result, the Image stabilization operation can be executed with high accuracy.

It should be noted that in the case of the present embodiment, the bracket member 84 of the vibration damping member 76 is fixed with interposition of the cushion member 82 in a state of being positioned with respect to the intermediate portion 66h of the flexible circuit board 66. In addition, the bracket member 84 is fixed to the base member 44 in a positioned state.

First, positioning and fixing of the bracket member 84 of the vibration damping member 76 to the base member 44 will be described. As shown in FIG. 12, a through-hole-shaped positioning recessed portion 84a is formed in the bracket member 84 of the vibration damping member 76. On the other hand, as shown in FIG. 8, the base member 44 is formed with a pin-shaped positioning protruding portion 44b that engages with the recessed portion 84a of the bracket member 84. By the recessed portion 84a of the bracket member 84 and the protruding portion 44b of the base member 44 being engaged with each other, the bracket member 84 of the vibration damping member 76 is positioned and fixed to the base member 44. It should be noted that unlike this, the protruding portion may be provided in the bracket member 84, and the recessed portion may be provided in the base member 44.

Figure 13:
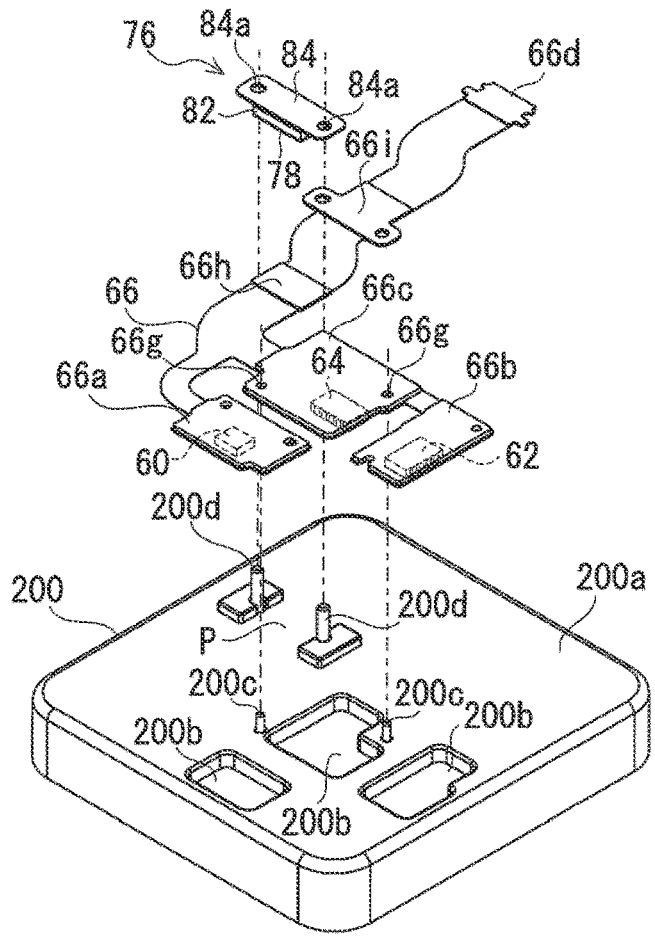
FIG. 13 is a perspective view of a jig for attaching the vibration damping member to a flexible circuit board of the sensor module in a positioned state.

FIG. 13 is a perspective view of a jig for attaching a vibration damping member to a flexible circuit board of a sensor module in a positioned state. In addition, FIG. 14 is a perspective view of the jig in a state in which the flexible circuit board of the sensor module is set.

Figure 14:
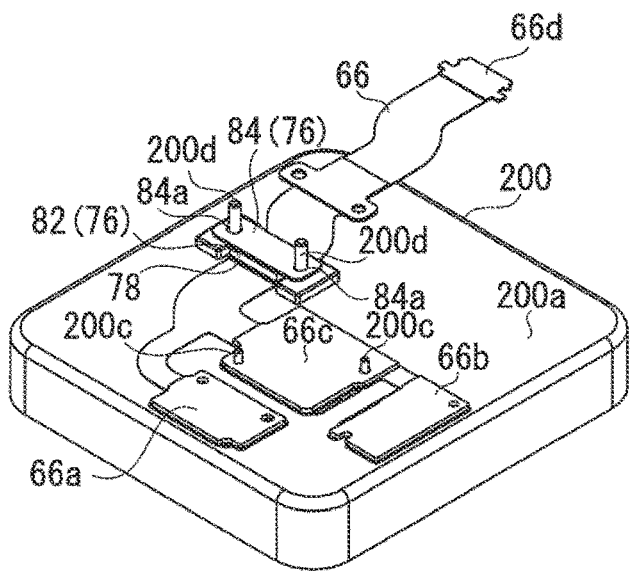
FIG. 14 is a perspective view of the jig in a state in which the flexible circuit board of the sensor module is set.

As shown in FIGS. 13 and 14, positioning and fixing of the vibration damping member 76 to the flexible circuit board 66 is performed using a jig 200. The jig 200 includes a flat placement surface 200a on which the flexible circuit board 66 is placed. It should be noted that the flexible circuit board 66 is placed on the placement surface 200a of the jig 200 in a state where the gyro sensors 60, 62, and 64 are positioned on the placement surface 200a side. To that end, recessed portions 200b for housing the gyro sensors 60, 62, and 64 are formed on the placement surface 200a of the jig 200.

The flexible circuit board 66 is placed (set) on the placement surface 200a of the jig 200 in a positioned state. In the case of the present embodiment, through hole-shaped recessed portions 66g formed in the sensor mounting portion 66c of the flexible circuit board 66 are used for positioning. That is, two positioning pins 200c to be engaged with the recessed portions 66g are provided on the placement surface 200a of the jig 200.

As shown in FIG. 14, when the flexible circuit board 66 is set in the jig 200 in a positioned state (a state where the positioning pins 200c are inserted into the recessed portions 66g), the intermediate portion 66h of the flexible circuit board 66 is set at a predetermined position P of the jig 200. Two guide pins 200d are provided on the placement surface 200a of the jig 200 so as to sandwich the predetermined position P. By inserting the guide pins 200d into the through hole-shaped recessed portions 84a of the bracket member 84 of the vibration damping member 76, the bracket member 84 of the vibration damping member 76 is positioned with respect to the intermediate portion 66h of the flexible circuit board 66. By sticking the cushion member 82 of the vibration damping member 76 to the flexible circuit board 66 with interposition of the double-sided tape 78 while maintaining this state, the bracket member 84 of the vibration damping member 76 is fixed to the intermediate portion 66h of the flexible circuit board 66 in a positioned state.

As described above, since the flexible circuit board 66 of the sensor module 42 is positioned and fixed to the base member 44 with interposition of the vibration damping member 76, variations are suppressed from occurring in the vibration damping effect due to the vibration damping member 76 in a plurality of imaging apparatuses 10. As a result, in the plurality of imaging apparatuses 10, the occurrence of variation in the accuracy of the Image stabilization, that is, variation in the image quality of the captured image is suppressed. It should be noted that the inventor has demonstrated the effect of the vibration damping member 76 by experiments.

In addition, in the case of the present embodiment, the flexible circuit board 66 is positioned and fixed to the base member 44 with interposition of the vibration damping member 76.

In the case of the present embodiment, after or before the sensor support member 68 is positioned and fixed to the base member 44 with interposition of the impact-absorbing members 48 and 50, the flexible circuit board 66 is positioned and fixed to the base member 44 with interposition of the vibration damping member 76. In the case of the present embodiment, the sensor support member 68 is positioned and fixed to the base member 44 with interposition of the impact-absorbing members 48 and 50 which are viscoelastic members. Accordingly, the gyro sensors 60, 62, and 64 on the sensor mounting portions 66a, 66b, and 66c positioned and fixed to the sensor support member 68 are positioned with respect to the base member 44. Then, the gyro sensors 60, 62, and 64 are positioned and arranged at predetermined positions in the imaging apparatus 10 through the base member 44 fixed to the top casing 20 of the housing 12. As a result, in a plurality of imaging apparatuses 10, the gyro sensors 60, 62, and 64 can detect vibration (corresponding angular velocity) with small variations and high accuracy.

In order to maintain the sensor support member 68 in a state of being positioned at the base member 44 with interposition of the impact-absorbing members 48 and 50, the portion of the flexible circuit board 66 from the sensor mounting portion 66c (first portion) fixed to the sensor support member 68 to the intermediate portion 66h (third portion) provided with the vibration damping member 76 is in a natural state. That is, the flexible circuit board 66 is positioned and fixed with respect to the base member 44 with interposition of the vibration damping member 76 so as to be in a natural state. The "natural state" as used herein refers to a state in which no external force substantially acts and no strain is generated (no internal stress is generated), that is, a state in which no deformation such as bending, torsion, or expansion/contraction is generated.

Unlike this, when the portion of the flexible circuit board 66 from the sensor mounting portion 66c to the intermediate portion 66h is deformed from the natural state, and for example, is bent, a restoring force continues to be generated in this portion. Due to the restoring force, the sensor mounting portion 66c (that is, the sensor support member 68) may be displaced over time.

Therefore, in the case of the present embodiment, as shown in FIGS. 4 to 6, the portion of the flexible circuit board 66 from the sensor mounting portion 66c to the intermediate portion 66h is planar so as to be in a natural state.

In the case of the present embodiment, as shown in FIGS. 4 and 5, the portion of the flexible circuit board 66 between the sensor mounting portion 66a and the branch portion 66e is bent. The restoring force is continuously generated in this portion, but the sensor support member 68 is not displaced (pivoted) by the restoring force. This is because the portion of the flexible circuit board 66 between the sensor mounting portion 66c and the branch portion 66e is sufficiently wide so that torsional rigidity is high, and the pivot of the sensor support member 68 due to the restoring force generated in the portion between the sensor mounting portion 66a and the branch portion 66e is suppressed.

Furthermore, in the case of the present embodiment, as shown in FIGS. 4 and 9, a portion of the flexible circuit board 66 between the sensor mounting portion 66c (first portion) and the intermediate portion 66h (third portion) provided with the vibration damping member 76 is not in contact with the base member 44. This is to prevent an impact from being transmitted from the base member 44 to which the impact derived from the shutter has been transmitted to the flexible circuit board 66. When in contact, an impact may be transmitted from the base member 44 to the gyro sensors 60, 62, and 64 through the flexible circuit board 66.

It should be noted that in the case of the present embodiment, as shown in FIGS. 4 to 6 and 8, the portion 66i of the flexible circuit board 66 between the connection portion 66d (second portion) connected to the control board 26 and the intermediate portion 66h (third portion) provided with the vibration damping member 76 is fixed to the base member 44 with interposition of a double-sided tape 88. This is to suppress the flexible circuit board 66 between the connection portion 66d and the intermediate portion 66h from flexurally vibrating. When this portion flexurally vibrates, the vibration damping member 76 cannot sufficiently absorb vibration from the connection portion 66d toward the sensor mounting portions 66a, 66b, and 66c. It should be noted that if the distance from the connection portion 66d to the intermediate portion 66h is short and the portion therebetween does not substantially flexurally vibrate, the fixing of the portion 66i of the flexible circuit board 66 may be omitted. In the case of the present embodiment, a recessed portion 66j having a through hole shape is formed in the vicinity of the portion 66i. By the recessed portion 66j engaging with the pin-shaped protruding portion 44c provided on the base member 44, the portion 66i of the flexible circuit board 66 is positioned and fixed to the base member 44.

According to the present embodiment as described above, in the imaging apparatus 10 including the gyro sensors 60, 62, and 64 for vibration detection, transmission of vibration to the gyro sensors 60, 62, and 64 through the flexible circuit board 66 connected to the gyro sensors 60, 62, and 64 can be suppressed.

Thus, although the embodiment of the present disclosure has been described with reference to the above-described embodiment, embodiments of the present disclosure are not limited thereto.

For example, in the case of the above-described embodiment, as shown in FIGS. 6 and 8, the vibration damping member 76 that suppresses vibration of the flexible circuit board 66 is fixed to the base member 44. However, the embodiment of the present disclosure is not limited thereto. For example, regarding the vibration damping member 76, the intermediate portion 66h (third portion) between the sensor mounting portion 66c (first portion) and the connection portion 66d (second portion) connected to the control board 26 in the flexible circuit board 66 may be fixed to the heat transfer member 90 different from the base member 44 shown in FIG. 2.

In addition, in the case of the above-described embodiment, the sensors 60, 62, and 64 of the sensor module 42 for detecting the vibration of the imaging apparatus 10 caused by the shaking of the hand of the user are gyro sensors. However, the embodiment of the present disclosure is not limited thereto. An acceleration sensor can also be used as a sensor for detecting vibration of the imaging apparatus 10.

Furthermore, in the case of the above-described embodiment, the flexible circuit board 66 of the sensor module 42 is connected to the control board 26. However, the embodiment of the present disclosure is not limited thereto. The flexible circuit board 66 may be connected to an electronic component different from that of the control board 26, for example, a control device such as a processor.

Furthermore, in the case of the above-described embodiment, as shown in FIGS. 8 and 9, the sensor module 42 is fixed to the base member 44 with interposition of the impact-absorbing members 48 and 50. However, the embodiment of the present disclosure is not limited thereto. If the impact derived from the shutter is not substantially transmitted to the gyro sensors 60, 62, and 64 of the sensor module 42 because the sensor module 42 is provided away from the shutter button or the shutter, the impact-absorbing members 48 and 50 may be omitted. In this case, the base member 44 and the sensor support member 68 may be integrated as one component.

In addition, in the case of the above-described embodiment, the wiring member connected to the gyro sensors 60, 62, and 64 is the flexible circuit board 66. However, the embodiment of the present disclosure is not limited thereto. The wiring member connected to the gyro sensors 60, 62, and 64 may be, for example, a lead wire.

That is, in a broad sense, the imaging apparatus according to the embodiment of the present disclosure includes: a sensor for vibration detection; an electronic component configured to receive a signal from the sensor; a wiring member including a first portion to be connected to the sensor and a second portion to be connected to the electronic component; a sensor support member to which the sensor and the first portion of the wiring member are fixed; and a vibration damping member provided for a third portion being an intermediate portion between the first portion and the second portion in the wiring member.

As described above, the above-described embodiments have been described as the exemplification of the technique in the present disclosure. To that end, drawings and a detailed description are provided. Therefore, among the components described in the drawings and the detailed description, not only the components essential for solving the problem, but also the components not essential for solving the problem may be included in order to exemplify the above technique. Therefore, it should not be recognized that these non-essential components are essential immediately because these non-essential components are described in the drawings and the detailed description.

In addition, since the above embodiments are for exemplifying the technique in the present disclosure, various changes, substitutions, additions, omissions, and the like can be made within the scope of the claims or the equivalent thereof.

The present disclosure is applicable to an imaging apparatus including a sensor for detecting vibration.

What is claimed is:

1. An imaging apparatus comprising:
a sensor for vibration detection;
an electronic component configured to receive a signal from the sensor;
a wiring member including a first portion to be connected to the sensor and a second portion to be connected to the electronic component;
a sensor support member to which the sensor and the first portion of the wiring member are fixed;
a vibration damping member provided for a third portion being an intermediate portion between the first portion and the second portion in the wiring member, and
a base member configured to support the sensor support member,
wherein the vibration damping member includes a cushion member that is to be fixed to the wiring member, and a bracket member that supports the cushion member and is to be fixed to the base member.

2. The imaging apparatus according to claim 1, further comprising:
an impact-absorbing member interposed between the sensor support member and the base member.

3. The imaging apparatus according to claim 2, wherein a portion between the first portion and the third portion in the wiring member is not in contact with the base member.

4. The imaging apparatus according to claim 2,
further comprising a shutter unit including a shutter, and
wherein the impact-absorbing member is a viscoelastic member disposed between the sensor support member and the base member facing each other in a moving direction of the shutter.

5. The imaging apparatus according to claim 1, wherein the bracket member of the vibration damping member is fixed to the third portion of the wiring member with interposition of the cushion member in a state of being positioned, and is fixed to the base member in a state of being positioned.

6. The imaging apparatus according to claim 1,
wherein the wiring member is a flexible circuit board, and
wherein a portion from the first portion to the third portion in the wiring member is in a natural state.

7. The imaging apparatus according to claim 1, wherein the sensor is a gyro sensor that detects angular velocity or an acceleration sensor that detects acceleration.

* * * * *